United States Patent Office 2,798,836
Patented July 9, 1957

2,798,836

INHALABLE LIVE VIRUS VETERINARY VACCINE

John Cecil Bird, Pleasantville, and Floyd Stephen Markham, Nanuet, N. Y., assignors to American Cyanamid Company, New York, N. Y., a corporation of Maine No Drawing. Application January 18, 1954,
Serial No. 404,782

7 Claims. (Cl. 167—78)

This invention relates to the vaccination of animals in veterinary medicine with a live virus vaccine sprayed as an aerosol from a pressurized dispenser, the veterinary vaccine, and its preparation. (Such dispensers are sometimes called "Freon bombs.")

A vaccine is a product consisting in whole or in part of infectious agents, living or dead, which is employed for the prevention or treatment of disease. In current therapeutic procedures the use of a living virus is preferred in many instances because it gives a superior and more dependable result and is more economical. In vaccination, which is the introduction into the tissues of the subject of the vaccine, it has been customary to administer the vaccine to the subject, by means of injection, or by puncture, or by rubbing or scratching into the skin or mucous membrane, or by dropping into the nose or throat, or by instillation into the eye. Such methods require the individual treatment of the subjects and in many instances are undesirable because of peculiar complications inherent in the particular vaccine being used or its method of administration.

In the treatment of large numbers of subjects such as poultry, the time required to individually handle and treat a large number of individual fowls renders vaccination comparatively expensive. For example, in the past it has been customary to treat poultry with a live virus for vaccination against Newcastle's disease and infectious bronchitis by an intranasal method involving capturing the individual bird and emplacing a drop of the desired vaccine in the nasal passages of the bird, or by dropping the material into the eye of the bird. Sometimes these, or other vaccines are administered by wing-web puncture, that is by dipping a needle into the vaccine and sticking the needle through the wing-web of the bird, thereby depositing a portion of the vaccine in the wing-web tissues.

These methods are effective, but are relatively expensive. At times, handling the birds will interfere with egg production, or cause other complications.

Attempts have also been made to vaccinate poultry by spraying an aqueous vaccine into the air which is breathed by the birds. This method has the advantage of saving time and labor because the birds may be caged in a group and treated rapidly. Unfortunately, the exact degree of dispersion of the spray and the exact potency of the virus in the vaccine being used is critical. A considerable portion of the vaccine is wasted because the aqueous spray particles containing the virus fall on the walls or floors of the chamber or the plumage of the birds stick thereto, and the particles are effectively removed from circulation and lost. Furthermore, particles which are too large settle too rapidly, and particles which are too small penetrate too deeply into the respiratory tract. For example, particles of the size which are delivered by a nebulizer (De Vilbiss Number 40), reach the pulmonary alveoli and are retained there. Hence this type of spray or fog may infect the entire respiratory surface, a circumstance which is likely to prove embarrassing to chicks which have no passive immunity to cushion the effects of such a massive infection.

While theoretically, such a method is useful, in field experiments, under the actual conditions of use, it is impossible to get unskilled farmers to use the meticulous care necessary to insure that the spray particle size is within an effective range. Even vaccination by itinerant "experts" who sell their services to farmers is likely to be associated with breaks in immunity and give results which can not be relied upon because the spray particles are not of the required size and potency. Further, the equipment used, and the travel of the operating personnel between flocks may spread other infections. The method of spraying is potentially successful, but frequently fails under field conditions.

It has now been found that a vaccine containing a live virus as a living organism but free from tissue may be dried by conventional means, using low temperatures and drying from the frozen state, to prepare a live, dry virus containing material and this live, dry virus containing material may be ground without killing the virus to a particle size within the range of from approximately 10 to 50 microns, and these virus containing particles, forming the vaccine are suspended in a volatile liquid under pressure, and dispersed by spraying into the air.

It is most surprising to find that live virus in the dried state will remain alive in the presence of volatile liquids such as the chlorofluoroalkanes.

Chloroform and idoform are effective disinfectants and have been used to kill viruses in the past and are used as disinfectants. Carbon tetrachloride has been used to kill rabies virus in the preparation of vaccines. It is accordingly most unusual to find that the chlorofluoro methanes and ethanes, sold under the trademark "Freon" not only do not kill the live virus but may be used in a suspending liquid in which to grind the virus containing particles and in which to store the virus until ready for use. There are several chlorofluorohydrocarbons which are in use in refrigeration systems and in the so-called "bombs" which are pressurized containers for the spraying of the materials contained therein. Such propellants include trichlorofluoromethane, dichlorodifluoromethane, dichlorofluoromethane, chlorodifluoromethane, trichlorofluoroethane, dichlorotetrafluoroethane (symmetrical), and mixtures of these and related compounds. Mixtures are generally preferred, as it is easier to choose a volatile liquid propellant which has the proper pressure at room temperature, and a permissible pressure at higher temperatures from the mixtures than from the pure compounds. Many of these compounds and mixtures are commercially available.

Containers and the valves for aerosol bombs are wellknown. The choice of the halogenated hydrocarbon which is used depends in part upon the pressure which is required for spraying the particular material being used in the particular container. Various types of spray valves are more effective at various pressures than are others. The first dispenser to appear on the commercial market used a comparatively high pressure type of container, whereas the newer dispensers have a much lower pressure container which is therefore somewhat more economical. Whereas any of the volatile liquids of the polyhaloalkane type may be used, it is particularly convenient to use a mixture of dichlorodifluoromethane which boils at about −30° C. and 1,1,2-trichloro-1,2,2-trifluoroethane which boils at about +48° C. These are sold as "Freon 12" and "Freon 113" respectively. By using approximately equal proportions of these two, it is convenient to make a spray dispenser which has a pressure of around 40 lbs. per sq. in. at an ordinary room temperature of 72° F. and is a very satisfactory spray dispenser. This combination is particularly convenient because part of the higher boiling material may be used to suspend the particles of the vaccine during grinding and may be used at room pressure and room temperature in the preparation of the vaccine. After filling the vaccine particles into the dispenser the more volatile component is added at low temperature and the dispenser is sealed giving a readily sprayable composition.

Commercial dispensers usually have a valve aperture of between about 18 and 24 thousandths of an inch and whereas this nozzle dimension may vary from these limits and still be suitable, it is the order of magnitude found most desirable. This vaccine must pass through this size aperture without clogging or otherwise encumbering the discharge of the spray dispenser. It is found that rather than the ponderous methods which have been used in the past to form sprays, such a dispenser forms a spray very cheaply and very rapidly. The volatile liquid forming the propellant evaporates, leaving dry, buoyant particles which remain suspended in the air for a long period of time which prolongs the opportunity for effective contact with the subject.

These spray dispensers have an additional advantage in that there is a slow diffusion of air and moisture through the rubber stoppers ordinarily used in vaccine containers. The diffusion is favored by the internal vacuum so that moisture penetrates the stopper lowering the storage life of the vaccine. With the use of the present dispensers containing a propellant under pressure, the diffusion of moisture into the dispenser is prevented. Further in the conventional preparation of an aqueous live virus vaccine, the vaccine is diluted with water and then used in the aqueous form. After addition of water, the storage life of the vaccine is approximately 24 hours.

The aerosol pressure dispensers discharge at a steady rate. The discharge rate gives a known rate of discharge over the entire life of the dispenser which is conveniently around 4 to 5 doses per second, so that from the number of subjects to be treated it is convenient to calculate the amount of time required for the dispersion of the required amount of vaccine. Meanwhile the remaining vaccine in the dispenser with the propellant is just as good and just as stable as in unused containers. This is particularly convenient for a small user to whom an unused portion of a reconstituted vaccine has represented a financial loss.

The new vaccine composed of live virus suspended in the volatile liquid propellant is as convenient a method of administering as is possible to conceive. A group of subjects, for instance birds, may be confined in a room, the container placed in the room, the valve opened, allowed to run for the time required to discharge the desired dose, the valve closed, and the birds allowed to remain in the room for a short period of time, after which they may be transferred to any convenient location or allowed to remain in same room.

The present method is also extremely convenient with vicious animals where it would be inconvenient or difficult to capture and confine the animal for the parenteral injection of a vaccine. No veterinarian would care to attempt to vaccinate a dangerous animal such as a lion or a vicious bull unless the animal were thoroughly tied down and confined so that it could not move during the course of the procedure. This, of course, requires time and frequently the efforts of more than one man. It is now possible to merely spray the vaccine as an aerosol in the direction of the animal so that the animal inhales it, so that special restraints are not required and there is no danger to the administrator.

The propellant may be any of the non-toxic, inert, volatile hydrocarbons which have a vapor pressure of between approximately 20 and 60 lbs. per sq. in. at a temperature of 20 to 30° C., and preferably no greater than approximately 200 lbs. per sq. in. at 55° C. Higher pressures may be used if the containers are designed to hold the more volatile propellants, but such high pressure containers are unnecessarily expensive. Non-inflammable non-explosive propellants are preferred.

The size of the dispenser is not critical and may vary depending on practical considerations, such as the number of subjects, but is principally governed by the size of dispenser which is commercially available and which may be easily moved around and handled. For poultry vaccination, dispensers holding from 150 to 250 grams of the propellant and which discharge in from 2 to 3 minutes are convenient working sizes.

The concentration of a dried vaccine material in the propellant is not critical. It must be sufficiently dilute that the vaccine particles are suspended by shaking and readily spray with the propellant used; preferably it is fairly concentrated so that too-large a dispenser is not required. Up to about 300 milligrams of the dried virus vaccine is easily suspended in from 150 to 250 grams of propellant, making a convenient working concentration.

The composition may be prepared by grinding the dried virus to a suitable particle size in the presence of a small amount of the propellant, conveniently a less volatile component, followed by diluting it with the rest of the propellants to form the desired suspension with the desired ratios of propellants to give the desired propellant pressures. The grinding may be done at room temperatures, in trichlorotrifluoroethane so that the final filling with the chilled propellant is all that must be done under low temperature conditions.

Preferably the virus material is ground to an average particle size of between about 10 and 50 microns. If too small a particle size is used, the individual particles of the virus material pass too deeply into the respiratory tract of the subject, getting down into the alveoli, and as a result, an extremely rapid and perhaps too powerful effect is obtained. If the particle size is too large, the solid particles, after volatilization of the propellant, settle out before they have a chance to be effective. It is preferred that the particles be such that if they settle on the feathers of the birds, they will be resuspended to cause a better taking of the vaccination and to also cause the vaccination of any birds which may not have received direct contact with the material as initially sprayed. Additional birds may be placed in the room after the vaccine has been sprayed therein, and the newly emplaced birds will be vaccinated adequately by the dust which is resuspended from the feathers of the birds previously vaccinated.

The same particle size preferred for the particles for dispersion as a dry dust, namely 10 to 50 microns average particle size, is also particularly advantageous from the standpoint of suspension in and dispersion by the volatile liquid propellant. In the preparation of a vaccine for use in the spray dispenser, it is normally desirable to use only the allantoic and amniotoic fluids of the egg embryo in which the virus is grown, as if the embryo itself is used in the preparation of the dried vaccine, there are apt to be particles of a fibrous nature present which can mat and clog the passages of the spray nozzle, and a non-matting fiber-free material is necessary in order that a satisfactory discharge be obtained from the nozzle. The degree of permitted fibrosity varies with the specific characteristics of the spray nozzle, and some types are better than others.

Various types of vaccines may be suspended in the propellant and dispersed as a dust. The method is particularly useful with Newcastle disease and infectious bronchitis in poultry. The vaccine itself may be prepared by growing a particular strain of the virus in chicken embryos. Usually an attenuated virus of low virulence is preferred. For example, with Newcastle disease the so-called B-1 strain of Hitchner and Johnson described in Veterinary Medicine, vol. 43, pgs. 525–530 (1948) makes a desirable vaccine. It is sufficiently attenuated that it does not cause undesirable effects in the poultry and at the same time induces immunization.

The method of preparing the vaccine is in accordance with the conventional practice of growing the desired strain in a chicken embryo, selecting that portion of the chicken embryo which contains the desired virus, and suspending the virus in a suitable medium, freezing and removing the water, thereby giving a dried material; except that fiber free portions of the embryo are preferred.

The dried virus containing material may be ground either in a tissue grinder or with the aid of glass beads in a shaking machine. The grinding may be done dry but is more conveniently done by suspending the material in part of the propellant.

The potency of the vaccine is measured in embryo lethal doses ($ELD_{50}$) which is a quantity of material which when suspended in 0.2 milliliter of aqueous diluent and injected into the chorioallantoic sacs of 9 to 12 day incubated chick embryos will kill or infect 50% of them. The material is injected in 5 eggs, then after an additional 6 days' incubation the eggs are checked to see if the embryo has been killed, or if the B-1 strain of Newcastle disease is used, to see if the allantoic fluid has the ability to agglutinate red blood cells in which case it is counted with the killed embryos. With field strains of Newcastle virus, the deaths are uniform after 72 to 96 hours. The $ELD_{50}$ is calculated by the method of Reed-Meunch, American Journal of Hygiene, 27, 493–497 (May 1938).

A Newcastle disease vaccine to provide an effective dose when applied to the nostril of a bird must titer approximately $10^{-4}$ $ELD_{50}$ doses per cc., usually expressed as $ELD_{50}$ $10^{-4}$, and preferably should not run over $10^{-8}$. A product which titers from $ELD_{50}$ $10^{-5}$ to $10^{-8}$ is preferred for use in preparing the dust. With infectious bronchitis virus, an $ELD_{50}$ titer from $10^{-1}$ to $10^{-5}$ is preferred. With other vaccines, other concentrations are within the useful range.

The Newcastle disease vaccine is particularly useful for experimental work as it is easy to determine the effect of the Newcastle disease vaccine because the Newcastle disease virus is capable of agglutinating chicken red blood cells. On the basis of this, a hemagglutination-inhibition test has been developed for the rapid, specific diagnosis of Newcastle disease. The principle of the hemagglutination-inhibition test is that in the presence of specific Newcastle disease antibodies, Newcastle disease virus is rendered incapable of agglutinating chicken red blood cells. A certain amount of virus is required to agglutinate a red cell, and therefore the number of cells that are agglutinated depends on the amount of virus present. In the hemagglutination-inhibition test, the Newcastle disease virus is mixed with chicken red blood cells and the serum sample to be tested for antibodies. A positive hemagglutination-inhibition test, that indicates no agglutination of the red cells, demonstrates the presence of specific Newcastle disease antibodies. This means either a present infection or an immunity in the bird from which the blood sample was drawn. Variations of this test may be used, one method is described in detail as the Official U. S. Department of Agriculture, Bureau of Animal Industries Method set forth in "The Hemagglutination and Hemagglutination-Inhibition Tests for the Diagnosis of Newcastle Disease" by the U. S. Department of Agriculture, Agricultural Research Administration, Bureau of Animal Industry, Pathological Division, October 21, 1946. Another satisfactory method is the Lederle method which is described in the instruction leaflet with the Newcastle Disease Diagnostic Antigen sold by Lederle Laboratories. The results of these methods are consistent. By the use of this diagnostic method, it is possible to very easily determine which birds have an effective vaccination, and to determine the utility of a particular method of vaccination. Preferably at least about 0.25 milligram of a dry virus residue having an $ELD_{50}$ titer of not less than $10^{-6.5}$ is used per bird for the spraying of Newcastle disease vaccine. It is not necessary that a separate suspension be used for each vaccine and, in poultry, it is possible to use a single suspension containing both Newcastle disease and infectious bronchitis vaccine. Other vaccines may be suspended in the propellant and any live virus vaccine which has been developed may be used, such as canine distemper, hepatitis, hog cholera, influenza, mumps, measles, or others.

A vaccine is used which is a modified virus. That is, a pathogenic virus treated under such conditions that it is attenuated and becomes less virulent, so that the subject has an extremely mild attack of the disease under consideration, which confers immunity against the more virulent strains with which the subject may come in contact. Such strains are well-known in certain diseases and are being developed in others. For example, in Newcastle disease, the so-called B-1 strain or Blacksburg strain is used as the vaccinating strain of virus. This material is grown under standard commercial conditions, and is readily available. Other strains of other viruses may be used as is obvious to those skilled in the art.

Example 1

250 milligrams of lyophilized virus residue, prepared by freezing and drying the allantoic and amniotic fluids from the eggs in which the virus was grown, was suspended in 5 milliliters of trichlorotrifluoroethane (Freon 113) and ground in a tissue grinder to an average particle size of approximately 25 microns. The 250 milligrams of the lyophilized, ground cake was placed in a dispenser to which was added 70 grams of trichlorotrifluoroethane. 75 grams of dichlorodifluoromethane were added at a low temperature, after which the dispenser was sealed. Such a dispenser is storage-stable for at least about a year at room temperature.

Two closed pens of a floor area of approximately 250 sq. ft. each and containing 50 twelve-week old bronze turkeys which, by blood tests, showed no evidence of immunity to Newcastle disease were exposed to the spray from the above dispenser for a period of 11 seconds. The dispenser showed a discharge of 4.5 doses per second (each dose being 0.5 milligram of virus particles), so that the 50 turkeys in each pen were exposed to 50 doses of vaccine. Blood samples collected 14 days later showed a high blood level of Newcastle disease virus antibodies (1 of 512 and 6 of 1024). The birds were immune on challenge.

Example 2

Two 150 gram dispensers were prepared as set forth in the proceding example; the first of which contained 250 milligrams of Newcastle disease vaccine virus, and the second of which contained 250 milligrams of infectious bronchitis vaccine, using the DG strain, from the University of New Hampshire. Four groups of 30 six-day old, susceptible White Leghorn chicks were treated as follows: The first, with the infectious bronchitis vaccine; the second, with the Newcastle disease vaccine; the third, with both vaccines; and the fourth, was isolated as a control group. The first two groups were exposed for 15 minutes in separate closets to the spray discharge for 10 seconds, that is 45 doses, or 1.5 doses per chick of 0.5 gram of virus material per dose. The third group was given a double exposure, that is, to the spray from each dispenser. After the birds were taken out of the spray closet and placed in a brooder, 10 unexposed hatch mates were added to each group. 19 days after exposure to the spray, the birds in the third group and the unexposed contact hatch mates of this group were bled for serological studies, and found to possess neutralizing antibodies for both Newcastle disease virus and infectious bronchitis virus, which is indicative of successful vaccination. On the next day, all of the surviving birds were challenged intranasally with virulent Newcastle disease virus. Upon challenge, none of the birds in the first group survived, whereas all of the birds in the second and third groups including the contacts which were added after exposure to the spray and received their sole immunization from the dust on the feathers of the birds in the brooder, showed no evidence of Newcastle disease. 13 of the 28 controls succumbed to challenge.

*Example 3*

Dispensers prepared in the manner described above were charged with a propellant suspension containing 250 milligrams of lyophilized Newcastle disease vaccine (B-1 strain) and 250 milligrams of infectious bronchitis vaccine (D-G strain) both of which vaccines had been ground in a shaking machine with the aid of glass beads to an average particle size of approximately 25 microns.

Twenty-four pens of 250 White Rock chicks 6 days of age were exposed to the discharge of the dispensers by opening the sealing valve of the container for 1.5 minutes thus discharging 125 milligrams of each type of vaccine for a calculated average of 1 dose (0.5 milligram) of each vaccine per bird.

Thirty-four days after vaccination blood samples were collected for serologic study. Neutralization tests showed 90 percent of the test birds had significant levels of antibody for both Newcastle disease virus and infectious bronchitis virus. The response of these birds to vaccination by this method is very satisfactory and comparable to that evoked by conventional methods in present use. Subsequent challenge with virulent virus demonstrated these birds to be immune.

We claim:

1. An inhalable live virus vaccine comprising substantially dry particles containing at least one species of a substantially dry avirulent live virus selected from the group consisting of Newcastle disease virus, infectious bronchitis virus, and a mixture of the same, said virus being dispersed in an inert non-flammable, non-explosive, non-toxic, non-irritating, volatile, non-aqueous liquid propellant selected from the group consisting of trichlorofluoromethane, dichlorodifluoromethane, dichlorofluoromethane, chlorodifluoromethane, trichlorofluoroethane, dichlorotetrafluoroethane, and mixtures of the same, said dry particles which contain said dry avirulent live virus being obtained from the propagation medium in which said virus is prepared, said dry particles having a size in the range of between about 10 to 50 microns.

2. An inhalable live virus vaccine as in claim 1 wherein said virus is a substantially dry avirulent live chicken embryo-origin virus of Newcastle disease.

3. An inhalable live virus vaccine as in claim 2 wherein said propellant is an inert non-flammable, non-explosive, non-irritating, non-toxic, volatile liquid mixture of dichlorodifluoromethane and 1,1,2-trichloro-1,2,2-trifluoroethane.

4. An inhalable live virus vaccine as in claim 1 wherein said virus is a substantially dry avirulent live chicken embryo-origin virus of infectious bronchitis.

5. An inhalable live virus vaccine as in claim 4 wherein said propellant is an inert non-flammable, non-explosive, non-toxic, non-irritating volatile liquid mixture of dichlorodifluoromethane and 1,1,2-trichloro-1,2,2-trifluoroethane.

6. An inhalable live virus vaccine as in claim 1 wherein the virus components of said vaccine are a combination of a substantially dry avirulent live chicken embryo-origin virus of Newcastle disease and a substantially dry avirulent live chicken embryo-origin virus of infectious bronchitis.

7. An inhalable live virus vaccine as in claim 6 wherein said propellant is an inert non-flammable, non-explosive, non-toxic, non-irritating, volatile liquid mixture of dichlorodifluoromethane and 1,1,2-trichloro-1,2,2-trifluoroethane.

References Cited in the file of this patent

UNITED STATES PATENTS

| | | |
|---|---|---|
| 1,503,864 | Vogt | Aug. 5, 1924 |
| 1,630,985 | Tival | May 31, 1927 |
| 2,533,065 | Tappin | Dec. 5, 1950 |

FOREIGN PATENTS

| | | |
|---|---|---|
| 527,803 | Great Britain | Oct. 16, 1940 |
| 506,095 | Great Britain | May 23, 1939 |

OTHER REFERENCES

Science News Letter, August 19, 1950, page 121.
Robertson: Science, June 4, 1943, page 500.
Gorham et al.: Science, January 22, 1954.
Brandly et al.: Am. J. Vet. Res., July 1946, pp. 307 and 313.
Kliewe Zentralblatte fur Bakteriol, vol. 148, 1942, pp. 388–395.
Anglesio-Minerva Medica, May 26, 1948, pp. 515–521, p. 521, col. 1, last par. esp. pert.
Behrens Biol. Abst., December 1953, vol. 27, No. 12, p. 2999, abstr. of article in Hoppe-Seyler's Zeisch. Physiol. Chem., vol. 291, 1952, pages 245–246.